United States Patent [19]

Takeuchi

[11] Patent Number: 4,470,494
[45] Date of Patent: Sep. 11, 1984

[54] CLUTCH DISK HAVING A SPLINED HUB

[75] Inventor: Hiroshi Takeuchi, Higashi-Osaka, Japan

[73] Assignee: Kabushiki Kaisha Daikin Seisakusho, Osaka, Japan

[21] Appl. No.: 347,158

[22] Filed: Feb. 9, 1982

[30] Foreign Application Priority Data

Feb. 19, 1981 [JP] Japan .................. 56-023170[U]

[51] Int. Cl.³ .............................................. F16D 3/14
[52] U.S. Cl. ............................ 192/106.2; 192/106.1; 192/70.17; 464/68; 464/84; 464/101
[58] Field of Search ............... 192/106.1, 106.2, 30 V, 192/55, 70.17; 464/84, 100, 101, 68, 81

[56] References Cited

U.S. PATENT DOCUMENTS

| 459,325 | 9/1891 | Whitney | 464/62 X |
|---|---|---|---|
| 1,953,211 | 4/1934 | Benedek | 464/101 |
| 1,990,683 | 2/1935 | Wood | 192/106.1 |
| 1,993,125 | 3/1935 | Tower et al. | 192/70.17 |
| 2,029,516 | 2/1936 | Tower | 192/106.1 |
| 2,088,979 | 8/1937 | Stanley | 192/106.1 |
| 2,124,734 | 7/1938 | Fies | 192/106.1 X |
| 2,276,416 | 3/1942 | Nutt | 192/106.2 |
| 2,775,105 | 12/1956 | Banker | 192/106.1 X |
| 2,899,038 | 8/1959 | Wellauer | 192/55 X |
| 3,534,841 | 10/1970 | Schneider et al. | 464/68 X |
| 3,754,624 | 8/1973 | Eldred | 192/106.1 X |
| 3,800,931 | 4/1974 | Maucher | 192/106.2 |
| 3,861,501 | 1/1975 | Brooks et al. | 192/30.2 X |
| 4,018,320 | 4/1977 | Schrape et al. | 464/68 |
| 4,185,728 | 1/1980 | Gatewood | 192/106.2 |
| 4,254,855 | 3/1981 | Hildebrand et al. | 192/106.2 |
| 4,257,510 | 3/1981 | Fisher | 192/106.1 |
| 4,295,348 | 10/1981 | Helfer et al. | 192/106.1 X |
| 4,301,907 | 11/1981 | Carpenter et al. | 192/106.2 |

FOREIGN PATENT DOCUMENTS 2242606 3/1975 France ........................ 192/106.2

Primary Examiner—Rodney H. Bonck
Assistant Examiner—David D. House
Attorney, Agent, or Firm—Armstrong, Nikaido, Marmelstein & Kubovcik

[57] ABSTRACT

A disc clutch, having a hub flange of a spline hub is divided into an internal flange with hub and an external flange which are meshed each other through teeth provided on adjoining circumferences of both with circumferential clearances kept between the teeth, a pair of sub plates formed solidly with the external flange, leaf springs between the sub plates and the internal flange interconnecting the internal and external flanges. Second and third springs function in between the external flange and a clutch plate and retaining plate provided on both sides thereof.

3 Claims, 6 Drawing Figures

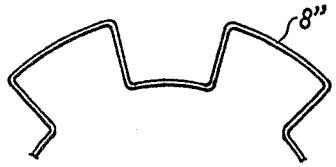
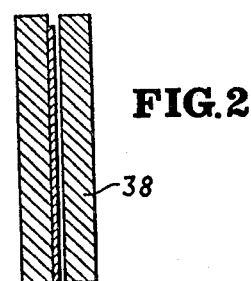
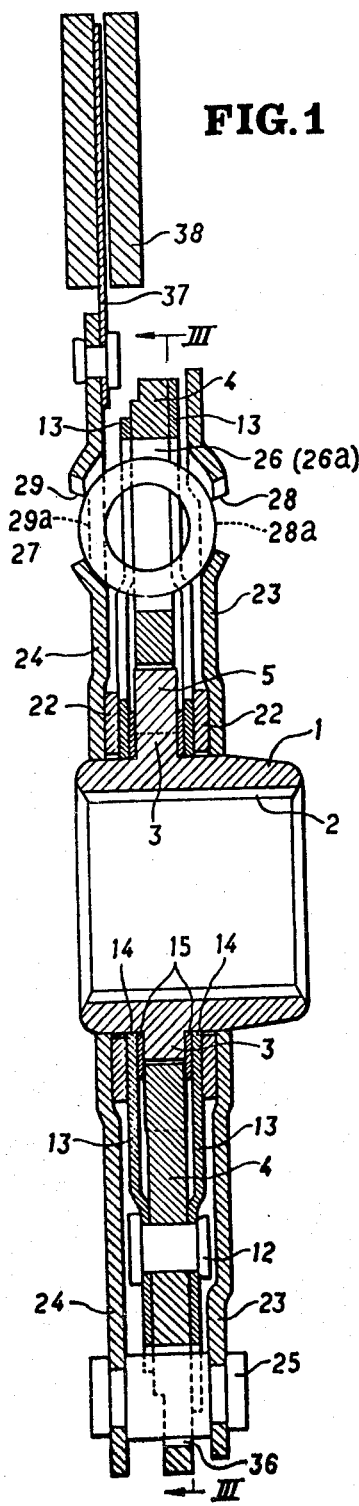

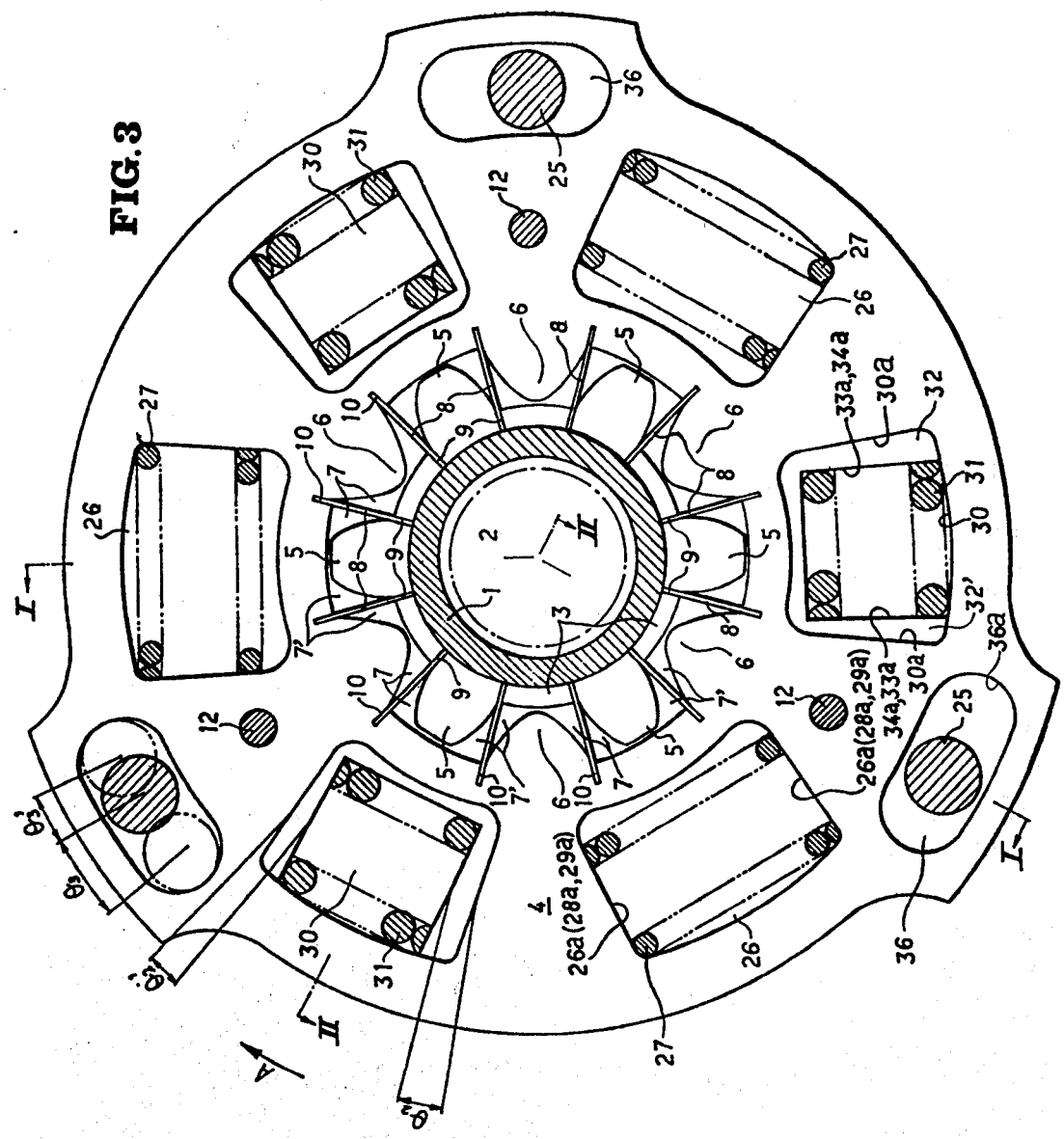

CLUTCH DISK HAVING A SPLINED HUB

FIELD OF THE INVENTION

This invention relates to a clutch disc mainly suitable for an automobile.

In a conventional clutch disc, a spline hub is formed solidly with a flange on which a first step spring hole, a second step spring hole, a third spring hole etc. and a stop pin hole (notch) must be provided. Therefore, these holes must be made close to each other in the circumferential direction causing a possible insufficient strength of the clutch disc. The first step spring is compressed over the entire range of the maximum torsional angle of the clutch disc. Not only does the stress increase in the disc but also, the optimum torsional characteristics are hard to obtain for the first step (low range of torsional angle).

SUMMARY OF THE INVENTION

An object of this invention is to provide a large maximum torsional angle in the first step spring in order to acquire a wide band of low torsional rigidity and low hysteresis for its torsional characteristics for the purpose of preventing chattering sounds during engine idling.

Another object of this invention is to make hysteresis in the torsional characteristics variable in accordance with a torsional angle, especially to decrease the stress in the first step torsion spring.

A further object of this invention is to make it possible to secure spaces for the torsion spring holes without lessening the strength of the spline hub flange.

In order to accomplish the above mentioned objects, in this invention the hub flange of the spline hub is divided into an internal flange with hub and an external flange which mesh together through teeth provided on adjoining circumferences of both with circumferential clearances kept between the teeth. A sub plate formed solidly with the external flange is introduced. The first step spring (a leaf spring) functions between the sub plate and the internal flange, and the second step & the third step springs function between the external flange and a clutch plate. A retaining plate is provided on both sides thereof.

BRIEF DESCRIPTION OF THE DRAWINGS

The invention will be better understood from the following description taken in connection with the accompanying drawings in which:

FIG. 1 is a vertical sectional view,

FIG. 2 is a partial vertical sectional view showing another section,

FIG. 3 is a sectional view taken substantially on the line III—III of FIG. 1,

FIGS. 5 & 6 are top plan views showing other configurations of the first step spring.

DETAILED DESCRIPTION OF THE INVENTION

Figure 4:
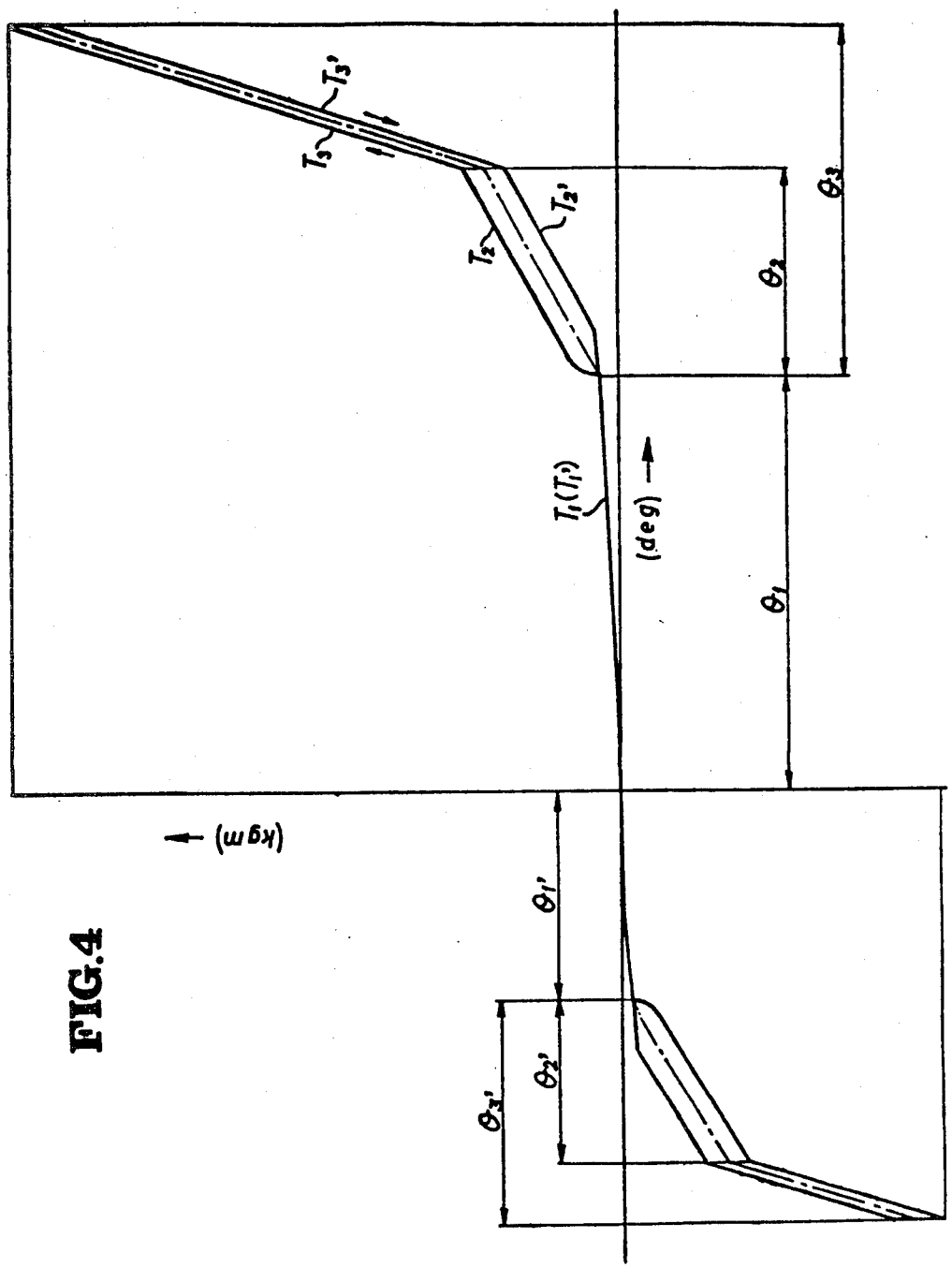
FIG. 4 is a diagram showing torsional characteristics.

In FIG. 1, a spline hub 1 spline fits onto a horizontal output clutch shaft (not shown in the figure) at an internal periphery of an internal spline 2, having an internal flange 3 solid therewith. Surrounding the internal flange 3 is an annular external flange 4 having approximately the same width as the internal flange 3 on the same vertical plane. As shown in FIG. 3, an external gear (generally equal to the trapezoidal involute tooth profile) provided on an external periphery of the internal flange 3 meshes with an internal gear 6 (generally equal to the conical involute tooth profile) provided on an internal periphery of the external flange 4 with circumferential clearances 7 & 7' kept between them. A plurality of thin rectangular leaf springs 8 (the first step spring) are distributed radially, one in each clearance 7 & 7'. The internal end of the leaf spring directed toward the disc center fits sliding freely into a groove 9 provided at the root of each tooth of the external gear 5. The external end of each spring 8 fits sliding freely into a groove 10 provided at the root of each tooth of the internal gear 6. Each leaf spring 8 is flat in a normal free condition.

A small radial clearance between the tooth top of the external gear 5 and the external flange 4 and a small radial clearance between the tooth top of the internal gear 6 and the internal flange 3 are kept constant by a pair of sub plates 13 & 13 (FIG. 1) which are fixed to both sides of the external flange 4 with a sub pin 12. The sub plates 13 & 13 are annularly formed by plate work; an internal peripheral surface 14 which fits closely to an external peripheral surface of the hub 1 to support the external flange 4 concentrically with the spline hub 1. Interposed between the inner sides of the sub plates 13 & 13 and both sides of the internal flange 3 are wave springs 15 & 15 respectively.

Against the outer sides of the sub plates 13 opposite to the internal flange 3, a retaining plate 23 and a clutch plate 24 respectively are pressed tightly together with interposed friction washers 22 & 22 (frictional material) by integrally interconnecting both plates 23 & 24 with a spot pin 25 so as to make them get nearer using a stop pin 25. The second step spring 27 is compressively incorporated in a spring hole 26, which is provided on the same circumference of the combined member of the external flange 4 and the sub plates 13, in such a way that the center line of the spring extends in the circumferential direction. Projecting portions of the spring 27 projecting on either side from the spring hole 26 fit in spring holes 28 & 29 provided on both plates 23 & 24. Circumferential end faces 26a, 28a, & 29a at either side of the spring holes 26, 28, & 29 coincide with each other in their circumferential positions under a neutral condition as illustrated in FIG. 3. Consequently, both end faces of the second step spring 27 contact compressively against the spring hole end faces 26a, 28a, and 29a under the neutral condition.

Three separate spring holes 30 (FIG. 2) are made on the same circumference of the combined member of the external flange 4 and the sub plates. A third step spring 31 is incorporated in this spring hole 30 with circumferential clearances 32 & 32' (FIG. 3) kept between them. Projecting portions of the spring 31 projecting on either side from the spring hole 30 compressively contact against end faces 33a & 34a of spring holes 33 & 34 provided in both plates 23 & 24.

The stop pin 25 is arranged in a pin hole 36 with circumferential clearances kept between the edges of the hole 36 and the pin 25. The hole 36 is provided in the combined member of the external flange 4 and the sub plates 13. Facings 38 are attached to a cushioning plate 37 which in turn is fixed to an external periphery of the clutch plate 24. The facings 38 can contact against a fly wheel on an engine side and a pressure plate on a clutch case side both of which are not illustrated in the figures.

Now, the functioning of the clutch disc will be described hereunder. When transmitting torque from the engine to a wheel shaft, the facing 38 on the external periphery of the disc is pressed against the flywheel to take out power from the clutch shaft in the spline hub 1. For convenience of description, however, considering the clutch disc with the assumption that the facing 38 is fixed and the spline hub 1 is turning, the first step spring (the leaf spring 8) deforms before everything because the sub plates 13 are held relatively stationary by the strong second step spring 27. A torque applied on the spline hub 1 in the direction of the arrow A (FIG. 3) is transmitted from the internal flange 3 through the leaf spring 8, the sub plates 13, the second step spring 27, the clutch plate 24, and the cushioning plate 37 to the facings 38. Since a sufficiently whippy and thin spring is used as the leaf spring 8 of the first step spring, an increase in the torsional torque in relation to an increase in the torsional angle is small as shown by T1 in FIG. 4. Moreover, T1 changes itself similarly to a quadratic curve because the contact points on the leaf spring 8 with the external gear 5 and the internal gear 6 come closer (a span between them becomes shorter) as the torsional angle increases to cause an increase in the stiffness. When the torsional angle gets to $\theta1$, the clearance 7 on the pitch circle between the external gear 5 and the internal gear 6 becomes zero. The teeth of the external gear 5 strikes against the teeth of the internal gear 6 through the leaf spring 8. The internal flange 3 begins to move integrally with the external flange 4 and the sub plates 13, thus the second step spring 27 starts to be subjected to compression (T2 in FIG. 4). When the external flange 4 rotates through an angle of $\theta2$ thereafter, the clearance 32 becomes zero. The end face 30a of the spring hole 30 strikes against an end face of the third step spring 31, and the third spring starts to be subjected to compression (T3 in FIG. 4). When the external flange 4 has rotated through an angle of $\theta3$ after beginning its rotation, the stop pin 25 strikes against the end face 36a of the pin hole 36, thus the entire disc begins to rotate integrally. Namely, the disc develops its maximum torsional angle thereat. The first step hysteresis is generated by friction between the sub plates 13 and the internal flange 3. The second step & third step hysteresis are generated by friction between the sub plates 13 and the clutch plate 24 and the retaining plate 23. The second step hysteresis is generated around the starting position of the second step T2 in the torsional characteristic curve. After getting to the point corresponding to the maximum torsional angle, the torsional torque changes along the lines T'3, T'2, and T'1 as the torsional angle decreases. Since the first step hysteresis is remarkably small, the torque curves T1 and T'1 are shown by the same curve. The torque characteristics where the torsional angle changes toward minus side are shown by curves $\theta1'$, $\theta2'$ and $\theta3'$ at the left half of FIG. 4.

As described above, in this invention the hub flange of the spline hub 1 is divided into the internal flange with hub 3 and the external flange 4 which mesh together through teeth provided on the adjoining circumferences of both with circumferential clearances kept between the teeth. A plurality of leaf springs are arranged radially in each clearance. The inner walls of the sub plates fixed to the sides of the external flange 4 are made to contact compressively against the sides of the internal flange 3. The friction materials 22 are compressively sandwiched by fastening together the retaining plate 23 and the clutch plate 24 which are arranged on the outer sides of the sub plates 13 i.e. opposite sides from the flange through the friction materials 22. The strong torsion springs 27 and 31 are incorporated in the spring holes 26, 28, and 29, and 30, 33, and 34 respectively which are provided in the retaining & clutch plates 23 & 24 and in the external flange 4. Each set of spring holes 26, 28, 29 or 30, 33, 34 are aligned axially by the respective springs 29, 31. Relief clearances become unnecessary in both circumferential directions of the spring hole 26 for the second step spring 27. The circumferential length of the spring hole 26 can be shortened as compared with a conventional one. Furthermore, the relief angles of the third step spring 31 (the clearances 32 & 32') can also be improved by the difference $\theta2$ by subtracting the second step starting angle $\theta1$ from the third step starting angle ($\theta1+\theta2$). The relief angle can also be improved by the difference $\theta3$ by subtracting the second step starting angle $\theta1$ from a stopper angle ($\theta1+\theta3$). An inner circumferential length of the spring hole which must be made on the external flange 4 can be remarkably shortened to provide ample spaces for incorporating the springs. Thus, the hub flange strength conspicuously increases to improve the torque transmitting capacity. The first step spring (leaf spring 8) is compressed only up to the second spring starting angle $\theta1$ thus being subjected to a smaller stress than a conventional one. Consequently, wear and fatigue of the first step spring can be prevented and simultaneously it becomes possible to select a spring having the optimum characteristics (such as low torsional rigidity & low hysteresis) for a wide range of applications as the first step. As seen from the above description, according to this invention it is possible to secure sufficient spaces for the spring holes without lessening the strength of the hub flange, to increase the maximum torsional angle, and to make the hysteresis variable. The leaf springs 8 distributed on the same circumference with the same pitch eliminates the possibility of disturbing the balance of the disc. In embodying this invention, the third step may be omitted. The stop pin may also be omitted by fully strengthening the final step spring. The stop pin hole may be formed at the edges of the spring holes 26 and 30. A U-shaped leaf spring 8' (FIG. 5) having a base of the same length with the root length or an annularly continued spring 8" (FIG. 6) can be introduced as a substitute for the leaf spring 8. The grooves 9 & 10 may be omitted in this case. More than two leaf springs 8 may be used in each clearance 7.

What is claimed is:
1. A clutch disc comprising
   a splined hub having an outer periphery,
   an internal flange integrally formed on said outer periphery of said hub, said internal flange having an outer circumference and a plurality of teeth with trapezoidal involute profiles on said outer circumference, each tooth has root portions and a top,
   an annular external flange of equal thickness to said internal flange radially aligned with said internal flange, said external flange having an inner circumference, and a plurality of teeth with trapezoidal involute profiles on said inner circumference meshing with said teeth of said internal flange with discrete circumferential clearances therebetween, each tooth having root portions and a top, a plurality of thin, rectangular leaf springs interposed in each said discrete circumferential clearances between said teeth of said external flange and said teeth of said internal flange, each said leaf spring having opposite ends and having one end slidingly fitted in a groove in said root portion of one tooth of said internal flange and its other end slidingly fitted in a groove in said root portion of one tooth of said external flange, each leaf spring being flat in a normal free condition, two annular sub plates disposed on axial opposite sides of said internal and external flanges, and having axially inner surfaces compressively contacting axial side surfaces of said external flange, said sub plates being attached to said external flange, two wave springs, each wave spring being compressively sandwiched between one sub plate and an axial side surface of said internal flange, said sub plates and said wave springs keeping said internal and external flanges and said leaf springs radially aligned, said sub plates keeping a small radial clearance constant between the tops of the teeth of the external flange and the root portions of the teeth of the internal flange and the tops of the teeth of the internal flange and the root portions of the teeth of the external flange, a clutch plate and a retaining plate disposed on axially opposite outer sides of said sub plates, and connected together, friction materials sandwiched compressively between said clutch plate and one sub plate and between said retaining plate and the other sub plate, and strong torsion springs provided in sets of spring holes in said retaining plate, said clutch plate, said sub plates and said external flange, each hole in a set being substantially axially aligned with the other holes in the set.

2. A clutch disc as set forth in claim 1, wherein the retaining plate and the clutch plate are interconnected by a stop pin at outer peripheries thereof, the stop pin being arranged in a pin hole provided on an outer periphery of the external flange and the sub plates with circumferential clearances kept between them.

3. A clutch disc as set forth in claim 2, wherein the stop pin hole is formed at an edge of one set of spring holes.

* * * * *